United States Patent [19]

Regimand et al.

[11] Patent Number: 4,587,623

[45] Date of Patent: May 6, 1986

[54] METHOD FOR RECALIBRATING NUCLEAR DENSITY GAUGES

[75] Inventors: Ali Regimand, Raleigh; John L. Molbert, Durham, both of N.C.

[73] Assignee: Troxler Electronic Laboratories, Inc., Research Triangle Park, N.C.

[21] Appl. No.: 488,739

[22] Filed: Apr. 26, 1983

[51] Int. Cl.⁴ .............................................. G06F 15/52
[52] U.S. Cl. .................................. 364/571; 250/252.1
[58] Field of Search .................... 364/571, 414; 250/252.1, 390 D, 390 E, 308; 378/89, 207

[56] References Cited

U.S. PATENT DOCUMENTS

| | | | |
|---|---|---|---|
| 3,334,230 | 8/1967 | Shaffer | 250/252.1 |
| 3,348,046 | 10/1967 | Lloyd | 250/308 |
| 3,668,401 | 6/1972 | Shah et al. | 250/308 |
| 3,742,217 | 6/1973 | Eakman et al. | 250/308 |
| 4,152,600 | 5/1979 | Berry | 250/252.1 |
| 4,155,009 | 5/1979 | Lieber et al. | 250/308 |

Primary Examiner—Gary Chin
Attorney, Agent, or Firm—Bell, Seltzer, Park & Gibson

[57] ABSTRACT

A method for recalibrating nuclear density gauges comprises the taking of count rate data from two calibration blocks, preferably magnesium and aluminum, for each source depth position of the gauge and thereafter computing new values for constants A and C in a standard working exponential equation for the gauge:

$$CR = A \exp(-BD) - C.$$

18 Claims, 2 Drawing Figures

BACKSCATTER MODE

BACKSCATTER MODE

DIRECT TRANSMISSION MODE

METHOD FOR RECALIBRATING NUCLEAR DENSITY GAUGES

BACKGROUND OF THE INVENTION

1. Field of the Invention

The present invention relates to the calibration of nuclear density gauges. More particularly, it relates to the recalibration of such gauges after a period of use.

2. Description of the Prior Art

Nuclear radiation gauges for determining density characteristics of soil and asphaltic materials are well known. One example of such a gauge is described in U.S. Pat. No. 2,781,453. Such gauges employ the phenomenon of Compton scattering of gamma rays and are well known to those skilled in the art as "scatter" gauges.

Nuclear density gauges currently in use, for example Troxler Model No. 3411-B manufactured by the assignee of the instant invention, employ a source that emits gamma radiation into the test specimen and a detector for accumulating counts of scattered radiation. The gauge typically rests on the surface of the test specimen. The source is vertically movable from a "backscatter" position where it resides within the gauge housing to a plurality of "direct transmission" positions where it is inserted at selected depths into bores in the test specimen.

As an industry standard, the counts received by the detector are related to the density of the test specimen by a working exponential equation containing three constants A, B, C. The equation may take the form $$CR = A \exp(-BD) - C,$$

where:
- CR = count ratio (the accumulated count normalized to a reference standard count for purposes of eliminating long term effects of source decay and electronic drift) and
- D = density calculated by the gauge.

The gauges are factory calibrated to arrive at values for constants A, B, C for each gauge.

The factory calibration is achieved by the accumulation of count data on at least three standard density calibration blocks. Accumulation of count rate data on other calibration blocks may be taken for the purpose of taking into account the composition of the soil and ashpaltic test specimens; however, in any event at least three blocks must be used to derive the three constants.

In normal use nuclear density gauges undergo stress that can change the geometry of the gauge. Changes in geometry, as well as other factors, affect the gauge calibration accuracy such that after a period of time there is a need for recalibration of the gauge to arrive at new values for the constants A, B, C. The standard practice in the industry has been for the gauge user to return the gauge to the factory, or to a regional recalibration center, where the factory calibration process is repeated.

The mentioned factory calibration process involves a rigorous iterative calculation process that, for all practical purposes, must be performed on a computer. Thus, there is a pressing need for a simplified recalibration technique, preferably one that can be performed in the field with a miniumum of equipment.

SUMMARY OF THE INVENTION

The present invention overcomes the disadvantages noted above. More particularly, the invention allows for the recalibration of nuclear density gauge using only two calibration blocks, greatly reducing data gathering and greatly simplifying calculations to a point where only simple exponential calculations are required.

Because of the simplicity of the recalibration technique of the invention, recalibration may be achieved in the field or at remote locations throughout the world, without the need to return the gauge to the factory or a specially equipped recalibration center.

The recalibration may be achieved with only two calibration blocks, preferably one magnesium and one aluminum, and a hand-held calculator capable of exponential functions. Where the calibration constants are entered into a memory associated with the gauge, means for entering the values is necessary, for example a PROM programmer.

In one aspect, the invention may be viewed as a method for recalibration of a nuclear density gauge for each one of the source depth positions thereof. The method comprises the steps of: (a) positioning the gauge with the source at a first source depth position with respect to a first calibration block (e.g. magnesium) of known density and obtaining an accumulated count of scattered radiation therefrom, comparing the accumulated count to a standard count to obtain a count ratio, and thereby establishing the relationship $$\text{(i) } CR_1' = A' \exp(B'D_1') - C,$$

where:
- $CR_1'$ = the count ratio from step (a), and
- $D_1'$ = the known density of the first calibration block.

The gauge is then (b) positioned with the source at the first depth position with respect to a second calibration block (e.g. aluminum) such that the following relationship is established $$\text{(ii) } CR_2' = A' \exp(-B'D_2') - C,$$

where:
- $CR_2'$ = the count ratio from step (b), and
- $D_2'$ = the known density of the second calibration block. With the assumption that constant B does not change in any statistically meaningful way throughout the useful life of the gauge, the equations (i) and (ii) may be solved to give values for the new calibration constants A' and C' for the first source depth position. The gauge may then be repositioned with the source at the remaining source depth positions of the gauge and steps A, B and C reexecuted for each remaining position. According to this method the gauge is accurately recalibrated for each source depth position with the use of only two density calibration blocks and a computing device capable of exponential functions.

BRIEF DESCRIPTION OF THE DRAWINGS

The invention will be more fully understood from the following detailed description thereof taken in connection with the accompanying drawings, in which.

DETAILED DESCRIPTION OF THE INVENTION

While the present invention will be described hereinafter with particular reference to the accompanying drawings, it is to be understood at the outset of the description which follows that it is comtemplated that the present invention may be varied in specific detail while still achieving the desirable characteristics and features of the present invention. Accordingly, the description is to be understood as a broad enabling teaching directed to persons skilled in the applicable arts, and is not to be understood as restrictive.

Figure 1:
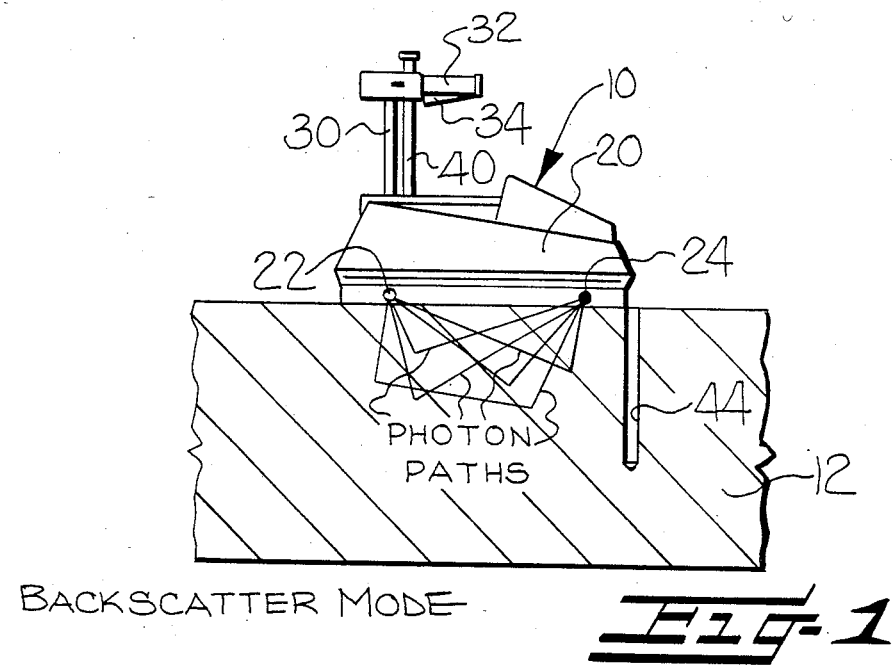
FIG. 1 is a side view of a nuclear density gauge in place over a calibration block, with the source located above the surface of the calibration block in the "backscatter" mode of operation.
Figure 2:
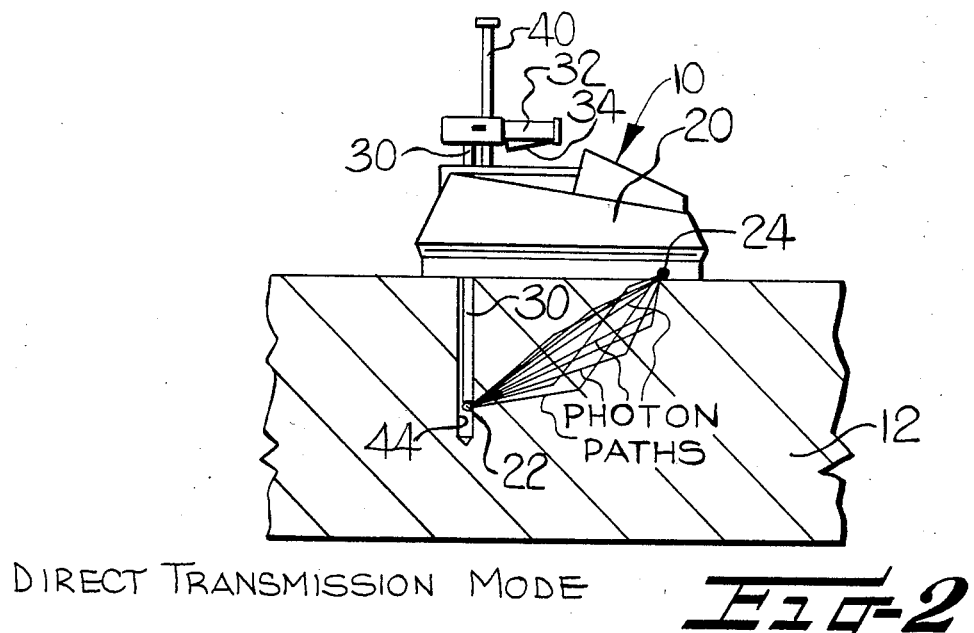
FIG. 2 is a side view similar to FIG. 1 with the source located at a predetermined depth within the calibration block in a "direct transmission" mode of operation.

Referring to the drawings, there is shown a nuclear density gauge 10 in place over a recalibration block 12 for accumulation of count rate information in the backscatter mode (FIG. 1) and a direct transmission mode (FIG. 2).

Gauge 10 includes a housing generally indicated at 20, a source of radiation 22, and a radiation detector 24. The radiation source may be a CS-137 source of gamma radiation and the detector may take the form of a Geiger-Mueller tube sensitive to photons.

Source 22 is mounted at the end of vertically movable probe rod 30. By means of a handle 32 and associated indexer trigger 34 source 22 is movable from a safe position (not shown) where the source is fully withdrawn within the housing, to a backscatter position (FIG. 1) and to a plurality of direct transmission positions, one of which is illustrated in FIG. 2. Notches or other indexing means (not shown) are provided on an indexing rod 40 so that source 22 and associated probe rod 30 may be indexed to each of the discrete direct transmission positions. Typically gauges of the above type provide for several direct transmission positions in the range from about two inches to about twelve inches in depth.

In the backscatter mode (FIG. 1) the gamma radiation is emitted into the calibration block (or test specimen, in field use) and scattered back to detector 24 randomly along photon paths as schematically illustrated in the drawing.

In the direct transmission mode (FIG. 2) the source is located at a selected depth position within a bore 44 of calibration block 12 and directly transmits photons along random paths to the detector as shown schematically in the drawing.

As noted above in connection with the Description of the Prior Art, each gauge is calibrated at the factory when it is manufactured for each source depth position by calibration tests taken on at least three calibration blocks, with the calibration data derived therefrom fitted to a working exponential equation $$CR = A \exp(-BD) - C,$$

where:
CR = count ratio derived by comparing an accumulated count from a test specimen to a standard count,
D = density of test specimen as calculated by the gauge,
A,C = contains obtained from original calibration, primarily dependent on gauge geometry, and
B = constant obtained from original calibration, primarily dependent on mass attenuation coefficient.

(As used herein the term "source depth position" is deemed to include each relevant direct transmission source depth position of the gauge, as well as the source position in the backscatter mode.)

Most gauges currently being manufactured include an associated memory (for example a PROM) for storing the three constants A, B, C for each source depth position. Thus, for a gauge having five source depth positions (one backscatter and four direct transmission) there would be five sets of constants A, B, C for a total of fifteen constant values stored in the PROM.

The original factory calibration of a gauge is an extremely time consuming proposition. Typically, for each source depth position counts of scattered radiation are taken on three metallic standards (for example magnesium, aluminum and a standard of intermediate density such as a laminated magnesium/aluminum block). The count data derived from the tests are normalized to a reference standard count (STDD) and expressed as "count ratios". The count ratios are then related to the densities of the three blocks by an exponential equation in the form discussed above. Thus, the three tests provide three sets of data and three equations that may be solved to give values for the three previously unknown constants, A, B, C.

Since the mass attenuation coefficients of the metallic standards typically utilized in the calibration process are substantially different from those of the test specimens for which the gauge is designed (soil and asphaltic materials), the constant values typically are adjusted to account for this difference. Further measurements and calculations, known to those skilled in the art, are used for this purpose.

As noted above, after the gauge has left the factory and has been in use for a period of time changes in gauge geometry, and other factors affecting gauge calibration accuracy, necessitate the recalibration of the gauge to establish a new working exponential equation $$CR' = A' \exp(-B'D') - C',$$

where:
CR' = count ratio derived by comparing an accumulated count from a test specimen to a standard count,
D' = density of test specimen as calculated by gauge,
A',C' = constants obtained from recalibration method, primarily dependent on gauge geometry, and
B' = constant obtained from recalibration method, primarily dependent on mass attenuation coefficient.

It has been found in accordance with the present invention that the constant B (or B') in the working exponential equations is a constant that is primarily dependent on the mass attentuation coefficient of the test specimens under consideration. The remaining constants A, C are primarily dependent upon gauge geometry and other factors that may be changeable during periods of operation of the gauge. Therefore, it has been found that the gauge may be recalibrated by a greatly simplified method as follows:

(a) positioning the gauge with the source at a first source depth position with respect to a first calibration block of known density and obtaining an accumulated count of scattered radiation therefrom, comparing the accumulated count to a standard count to obtain a count ratio, and thereby establishing the following relationship, $$CR_1' = A' \exp(-B'D_1') - C,$$

where:
$CR_1'$ = the count ratio from step (a), and
$D_1'$ = the known density of the first calibration block;

(b) positioning the gauge with the source at the first source depth position with respect to a second calibration block of known density and obtaining an accumulated count of scattered radiation therefrom, comparing the accumulated count to a standard count to obtain a count ratio, and thereby establishing the following relationship, (ii) I $CR_2' = A' \exp(-B'D_2') - C,$ where:
$CR_2'$ = the count ratio from step (b), and
$D_2'$ = the known density of the second calibration block;

(c) with the assumption $B' = B$, solving equations (i) and (ii) to obtain values for the unknowns, $A'$ and $C'$ corresponding to the first source depth position; and (d) repositioning the source to the remaining source depth positions of the gauge and reexecuting steps (a), (b) and (c) for each remaining position.

It will be appreciated that the method described above requires the use of only two calibration blocks and is dependent upon the earlier calibration only to the extend that the constant B is assumed not to change. Further, no adjustment of the new constants $A'$, $C'$ need be made to account for the difference in composition between the metal calibration standards and the soil and asphaltic test specimens because this factor is already incorporated into the value of constant B. Therefore, the calculations performed are simple exponential calculations.

The only equipment needed for recalibration according to the method of the invention are two calibration blocks and a hand-held calculator capable of exponential functions. Where the value of the constants are stored in a memory associated with the gauge, for example a PROM, the new values $A'$ and $C'$ for each source depth position are substituted for the originally calibrated values A and C. In this situation, a PROM programmer may be used.

Best results have been achieved by utilization of first and second calibration blocks that have densities approximately at the two respective ends of the relevant density range for the gauge. Suitable blocks achieving this result are blocks of aluminum and magnesium. Further, blocks of other materials, for example granite (having a density approximatley the same as aluminum), may be used.

While it is often best to have the densities of the calibration blocks at the ends of the density range for the gauge, a block of intermediate density, such as a laminated magnesium/aluminum block, may be used as one of the two blocks.

It will be appreciated that step (c) of the above method may be achieved by first subtracting one of equations (i), (ii) from the other to solve for $A'$ as follows:

$$A' = \frac{CR_1' - CR_2'}{\exp(-BD_1') - \exp(-BD_2')}$$

and thereafter substituting the value of $A'$ into equation (i) or equation (ii) to solve for $C'$.

The method of the invention may be easily performed by personnel familiar with the use of the gauge and may be easily reduced to a standard step-by-step form to facilitate the recalibration operation. A sample of a step-by-step form is as follows for a gauge having, for example, five source depth positions (backscatter and two inch, four inch, six inch and eight inch direct transmission depth positions):

Step 1. Enter values for B for each source depth position (from original factory calibration).

| Source Depth | B |
|---|---|
| Backscatter | |
| 2 inch | |
| 4 inch | |
| 6 inch | |
| 8 inch | |

Step 2. Enter unknown densities of first and second calibration blocks.

| | |
|---|---|
| Magnesium Block | ___ Kg/m³ |
| Aluminum Block | ___ Kg/m³ |

Step 3. Obtain accumulated counts on magnesium block ($C_1$) and aluminum block ($C_2$) for each source depth position.

| Source Depth | Magnesium ($C_1$) | Aluminum ($C_2$) |
|---|---|---|
| Backscatter | | |
| 2 inch | | |
| 4 inch | | |
| 6 inch | | |
| 8 inch | | |

Step 4. Obtain density standard count (STDD)
STDD ___

Step 5. Calculation of constants $A'$ and $C'$.

| Source depth | I = $\frac{C_1 - C_2}{STDD}$ | II = $\exp(-B \times D_1)$ | III = $\exp(-B \times D_2)$ | IV = II − III |
|---|---|---|---|---|
| Backscatter | | | | |
| 2 inch | | | | |
| 4 inch | | | | |
| 6 inch | | | | |
| 8 inch | | | | |

$A' = I/IV$   $C' = ((A' \times II \times STDD) - C_1)/STDD)$

| | | |
|---|---|---|
| Backscatter | | |
| 2 inch | | |
| 4 inch | | |
| 6 inch | | |
| 8 inch | | |

Step 6. Enter the values of $A'$ and $C'$ for each source depth position into the PROM programmer and burn into PROM (B remains unchanged from previous calibration).

While the present invention has been described in connection with an illustrated embodiment, it will be appreciated that modification may be made without departing from the true spirit and scope of the invention.

What is claimed is:

1. A method for recalibration of a nuclear density gauge for one source depth position thereof to account for changes in gauge geometry and other factors affecting gauge calibration accuracy and wherein the gauge has been previously calibrated for the source depth position by calibration tests taken on at least three calibration blocks, with the calibration data derived therefrom fitted to a working exponential equation $$CR = A \exp(-BD) - C,$$

where:
- CR = count ratio derived by comparing an accumulated count from a test specimen to a standard count,
- D = density of test specimen as calculated by the gauge,
- A,C = constants obtained from original calibration, primarily dependent on gauge geometry, and
- B = constant obtained from original calibration, primarily dependent on mass attenuation coefficient, and with the original calibration constants A, B, and C for the gauge being recorded and used in the calculation of density D measured by the gauge, said method comprising the steps of:
  (a) obtaining the recorded original calibration constant B for the gauge,
  (b) positioning the gauge with the source at said source depth position with respect to a first calibration block of known density and obtaining an accumulated count of scattered radiation therefrom, comparing the accumulated count to a standard count to obtain a count ratio, and establishing therefrom the following relations, (i) $CR_1' = A' \exp(-B'D_1') - C,$ where:
  - $CR_1'$ = the count ratio from step (b), and
  - $D_1'$ = the known density of the first calibration block;
  - $A',B',C'$ = constants obtained from recalibration method;

(c) positioning the gauge with the source at said depth position with respect to a second calibration block of known density different from that of said first block and obtaining an accumulated count of scattered radiation therefrom, comparing the accumulated count to a standard count to obtain a count ratio, and establishing therefrom the following relationship, (ii) $CR_2' = A' \exp(-B'D_2') - C,$ where:
  - $CR_2'$ = the count ratio from step (c), and
  - $D_2'$ = the known density of the second calibration block;

(d) calculating values for the unknowns, A' and C' from the equations (i) and (ii) by employing as the calibration constant B', the original calibration constant B, and
  (e) storing the thus derived values for A' and C' for subsequent use in determining density the D in the operation of the gauge.

2. A method as set forth in claim 1 wherein one of the calibration blocks is formed from aluminum.

3. A method as set forth in claim 1 wherein one of the calibration blocks is formed from magnesium.

4. A method as set forth in claim 1 wherein the first and second calibration blocks are formed from aluminum and magnesium, respectively.

5. A method as set forth in claim 1 wherein the first and second calibration blocks have densities approximately at the two respective ends of the relevant density range for the gauge.

6. A method as set forth in claim 1 wherein said one source depth position corresponds to the backscatter mode of operation of the gauge where the source is located above the surface of the calibration blocks.

7. A method as set forth in claim 1 wherein said one source depth position corresponds to a direct transmission mode of operation where the source is located a predetermined depth in the calibration blocks in the range from about two inches to about twelve inches.

8. A method as set forth in claim 1 including the step of repositioning the source to other source depth positions of the gauge and reexecuting steps (b) (c) and (d) for each additional position.

9. A method as set forth in claim 1 wherein step (d) is achieved by first subtracting one of equations (i), (ii) from the other to solve for A' as follows:

$$A' = \frac{CR_1' - CR_2'}{\exp(-BD_1') - \exp(-BD_2')}$$

and thereafter substituting the value of A' into equation (i) or equation (ii) to solve for C'.

10. A method for recalibration of a nuclear density gauge for each one of the source depth positions thereof to account for changes in gauge geometry and other factors affecting gauge calibration accuracy and wherein the gauge has been previously calibrated for each source depth position by calibration tests taken on at least three calibration blocks, with the calibration data derived therefrom fitted to a working exponential equation as follows for each source depth position $$CR = A \exp(-BD) - C,$$

where:
- CR = count ratio derived by comparing an accumulated count from a test specimen to a standard count,
- D = density of test specimen as calculated by the gauge,
- A,C = constants obtained from original calibration, primarily dependent on gauge geometry, and
- B = constant obtained from original calibration, primarily dependent on mass attenuation coefficient, and with the original calibration constants A, B, and C for the gauge being stored in a memory associated with the gauge and used in the calculation of density D measured by the gauge, said method comprising the steps of:
  (a) obtaining the recorded original calibration constant B for the gauge,
  (b) positioning the gauge with the source at a first source depth position with respect to a first calibration block of unknown density and obtaining an accumulated count of scattered radiation therefrom, comparing the accumulated count to a standard count to obtain a count ratio, and thereby establishing the following relationship, (i) $CR_1' = A' \exp(-B'D_1') - C$, where:
- $CR_1'$ = the count ratio from step (a), and
- $D_1'$ = the known density of the first calibration block;

(c) positioning the gauge with the source at the first source depth position with respect to a second calibration block of known density and obtaining an accumulated count of scattered radiation therefrom, comparing the accumulated count to a standard count to obtain a count ratio, and thereby establishing the following relationship, (ii) $CR_2' = A' \exp(-B'D_2') - C$, where:
- $CR_2'$ = the count ratio from step (c), and
- $D_2'$ = the known density of the second calibration block;

(d) calculating values for the unknowns, $A'$ and $C'$ from the equations (i) and (ii) by employing as the calibration constant $B'$, the original calibration constant $B$;

(e) storing the thus derived values for $A'$ and $C'$ for the source depth position in a memory device associated with the gauge for subsequent use in determining the density $D$ in the operation of the gauge;

(f) repositioning the source to the remaining source depth positions of the gauge and reexecuting steps (b), (c), (d), and (e) for each remaining position, whereby the density gauge may be accurately recalibrated for each source depth position with the use of only two density calibration blocks and a computing device capable of exponential functions; and (g) thereafter positioning the recalibrated gauge on a test specimen and measuring the density $D$ thereof using the newly derived and stored constants $A'$ and $C'$.

11. A method as set forth in claim 10 wherein one of the calibration blocks is formed from aluminum.

12. A method as set forth in claim 10 wherein one of the calibration blocks is formed from magnesium.

13. A method as set forth in claim 10 wherein one of the calibration blocks is formed from granite.

14. A method as set forth in claim 10 wherein one of the calibration blocks is a laminated magnesium/aluminum block.

15. A method as set forth in claim 10 wherein said one source depth corresponds to the backscatter mode of operation of the gauge where the source is located above the surface of the calibration blocks and the remaining source depth positions correspond to the direct transmission mode of operation where the source is located a predetermined depth in the calibration blocks in the range from about two inches to about twelve inches.

16. A method as set forth in claim 10 wherein step (d) is achieved by first subtracting one of equations (i), (ii) from the other to solve for $A'$ as follows:

$$A' = \frac{CR_1' - CR_2'}{\exp(-BD_1') - \exp(-BD_2')}$$

and thereafter substituting the value of $A'$ into equation (i) or equation (ii) to solve for $C'$.

17. A method for recalibration of a nuclear density gauge for each of the backscatter and direct transmission source depth positions thereof to account for changes in gauge geometry and other factors affecting gauge calibration accuracy and wherein the gauge has been previously calibrated for the source depth position by calibration tests taken on at least three calibration blocks, with the calibration data derived therefrom fitted to a working exponential equation as follows for each source depth position $$CR = A\exp(-BD) - C,$$

where:
- $CR$ = count ratio derived by comparing an accumulated count from a test specimen to a standard count,
- $D$ = density of test specimen as calculated by the gauge,
- $A, C$ = constants obtained from original calibration, primarily dependent on gauge geometry, and
- $B$ = constant obtained from original calibration, primarily dependent on mass attenuation coefficient, and with the values of the constants $A$, $B$ and $C$ being stored in a PROM associated with the gauge, said method for recalibration serving to establish a new working exponential equation $$CR' = A'\exp(-B'D') - C'$$

where:
- $CR'$ = count ratio derived by comparing an accumulated count from a test specimen to a standard count,
- $D'$ = density of test specimen as calculated by gauge,
- $A'$, $C'$ = constants obtained from recalibration method, primarily dependent on gauge geometry, and
- $B'$ = constant obtained from recalibration method, primarily dependent on mass attenuation coefficient, said method comprising the steps of:

(a) positioning the gauge with the source at a first source depth position with respect to a magnesium calibration block of known density obtaining an accumulated count of scattered radiation therefrom, comparing the accumulated count to a standard count to obtain a count ratio, and thereby establishing the following relationship, (i) $CR_1' = A'\exp(-B'D_1') - C$, where:
- $CR_1'$ = the count ratio from step (a), and
- $D_1'$ = the known density of the magnesium calibration block;

(b) positioning the gauge with the source at the first source depth position with respect to an aluminum calibration block of known density and obtaining an accumulated count of scattered radiation therefrom, comparing the accumulated count to a standard count to obtain a count ratio, and thereby establishing the following relationship, (ii) $CR_2' = A'\exp(-B'D_2') - C$, where:

$CR_2'$ = the count ratio from step (b), and
$D_2'$ = the known density of the aluminum calibration block;

(c) with the assumption $B' = B$, solving equations (i) and (ii) to obtain values for the unknowns, $A'$ and $C'$ corresponding to the first source depth position; and (d) repositioning the source to the remaining source depth positions of the gauge and reexecuting steps (a), (b) and (c) for each remaining position; and (e) for each storage depth position, substituting in the PROM the new values $A'$ and $C'$ for the original values A and C;

whereby the density gauge may be accurately recalibrated with the use of one magnesium calibration block and one aluminum calibration block, a computing device capable of exponential functions and a PROM programmer.

18. A method as set forth in claim 17 wherein step (c) is achieved by first subtracting one of equations (i), (ii) from the other to solve for $A'$ as follows:

$$A' = \frac{CR_1' - CR_2'}{\exp(-BD_1') - \exp(-BD_2')}$$

and thereafter substituting the value of $A'$ into equation (i) or equation (ii) to solve for $C'$.

* * * * *

UNITED STATES PATENT AND TRADEMARK OFFICE
CERTIFICATE OF CORRECTION

PATENT NO. : 4,587,623

DATED : May 6, 1986

INVENTOR(S) : Ali Regimand and John L. Molbert

It is certified that error appears in the above-identified patent and that said Letters Patent is hereby corrected as shown below:

Column 3, line 67, "contains" should be -- constants -- .

Column 9, line 52, insert the word "position" before the word corresponds .

Signed and Sealed this

Twelfth Day of August 1986

[SEAL]

Attest:

DONALD J. QUIGG

Attesting Officer     Commissioner of Patents and Trademarks